United States Patent [19]
Cherkasky et al.

[11] Patent Number: 4,539,213
[45] Date of Patent: Sep. 3, 1985

[54] METHOD FOR MAKING DEEP DISH PIZZA CRUSTS OR THE LIKE

[75] Inventors: Miles R. Cherkasky, 833 E. Washington St., Appleton, Wis. 54912; Ernest V. Canamero, Green Bay, Wis.

[73] Assignee: Miles R. Cherkasky, Appleton, Wis.

[21] Appl. No.: 613,237

[22] Filed: May 24, 1984

Related U.S. Application Data

[62] Division of Ser. No. 472,555, Mar. 7, 1983, Pat. No. 4,500,276.

[51] Int. Cl.³ .......................... A21C 3/02; A21C 11/10
[52] U.S. Cl. ...................................... 426/512; 426/503
[58] Field of Search ............... 426/496, 512, 517, 518, 426/503; 425/297, 298, 301, 299, 306, 308, 417, 457, 302.1; 249/65

[56] References Cited

U.S. PATENT DOCUMENTS

| | | | |
|---|---|---|---|
| 2,160,783 | 5/1939 | McDonald | 425/298 |
| 3,109,390 | 11/1963 | Jahn et al. | 425/302.1 |
| 3,433,181 | 3/1969 | Steins | 425/299 |
| 3,782,271 | 1/1974 | Tobey et al. | 425/298 |

*Primary Examiner*—George Yeung
*Attorney, Agent, or Firm*—Fuller, House & Hohenfeldt

[57] ABSTRACT

Apparatus and method for continuously forming pizza crusts, particularly deep dish pizza crusts having substantially vertical sidewalls, in pizza pans of corresponding shape. A ribbon of deep dish pizza dough is formed and superimposed on a conveyor comprising flights including upstanding cutting rings within which pizza pans to be filled are disposed. A roller passing over the cutting rings severs dough disks disposed within each cutting ring; the dough disks drop into each pizza pan. Each pan is then registered with a diaphragm which is inflated to urge each dough disk into intimate conformity with the pan, then the diaphragm is withdrawn from the pan, leaving a finished crust. A carriage periodically moves the diaphragm in the contra-machine direction to engage the following flight. The pans are then removed from the conveyor flights to recover pan and pizza crust assemblies. The diaphragm carriage is driven in the machine direction by the conveyor to ensure accurate registration between the diaphragm and pan when the diaphragm is distended.

3 Claims, 7 Drawing Figures

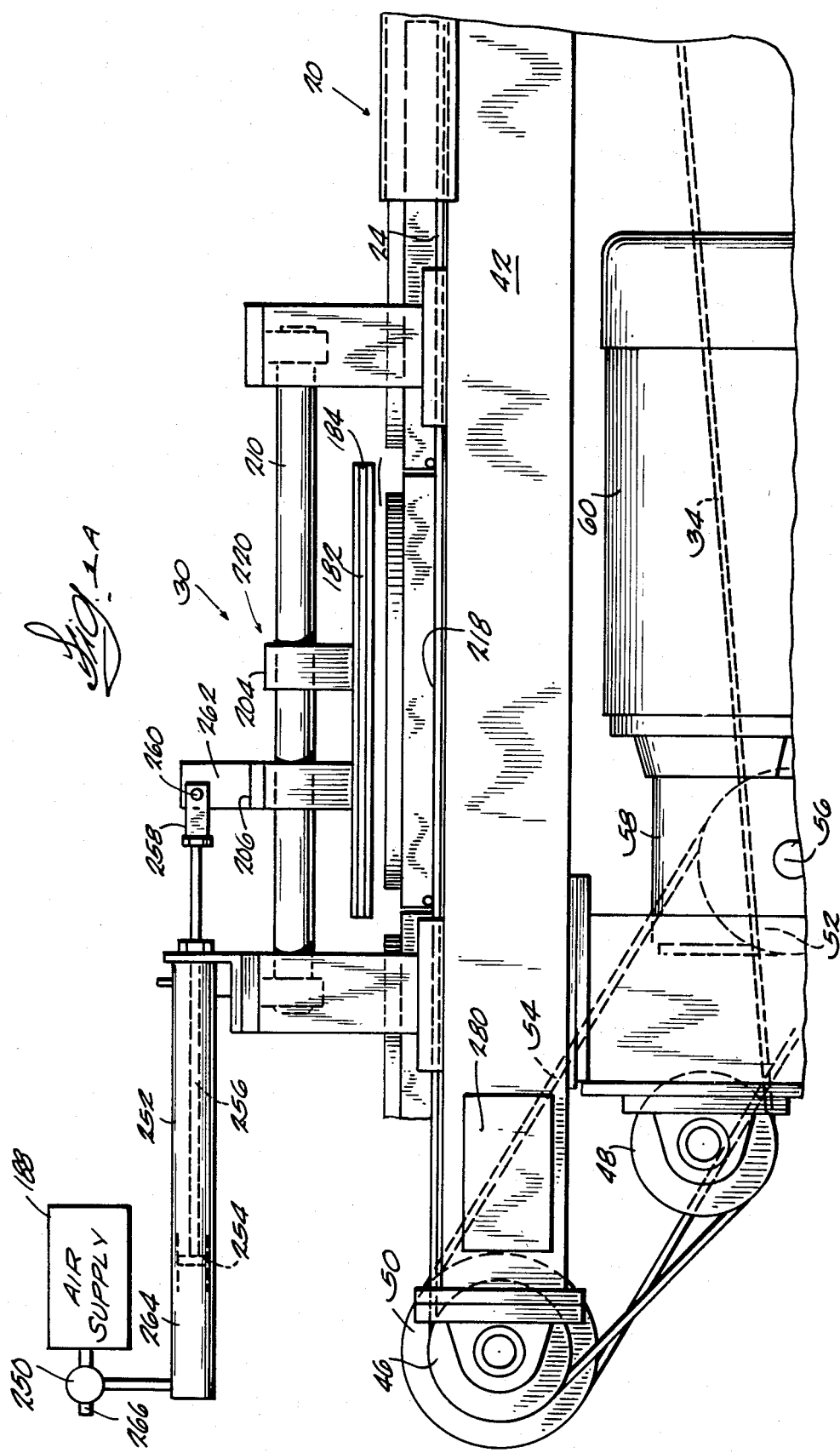

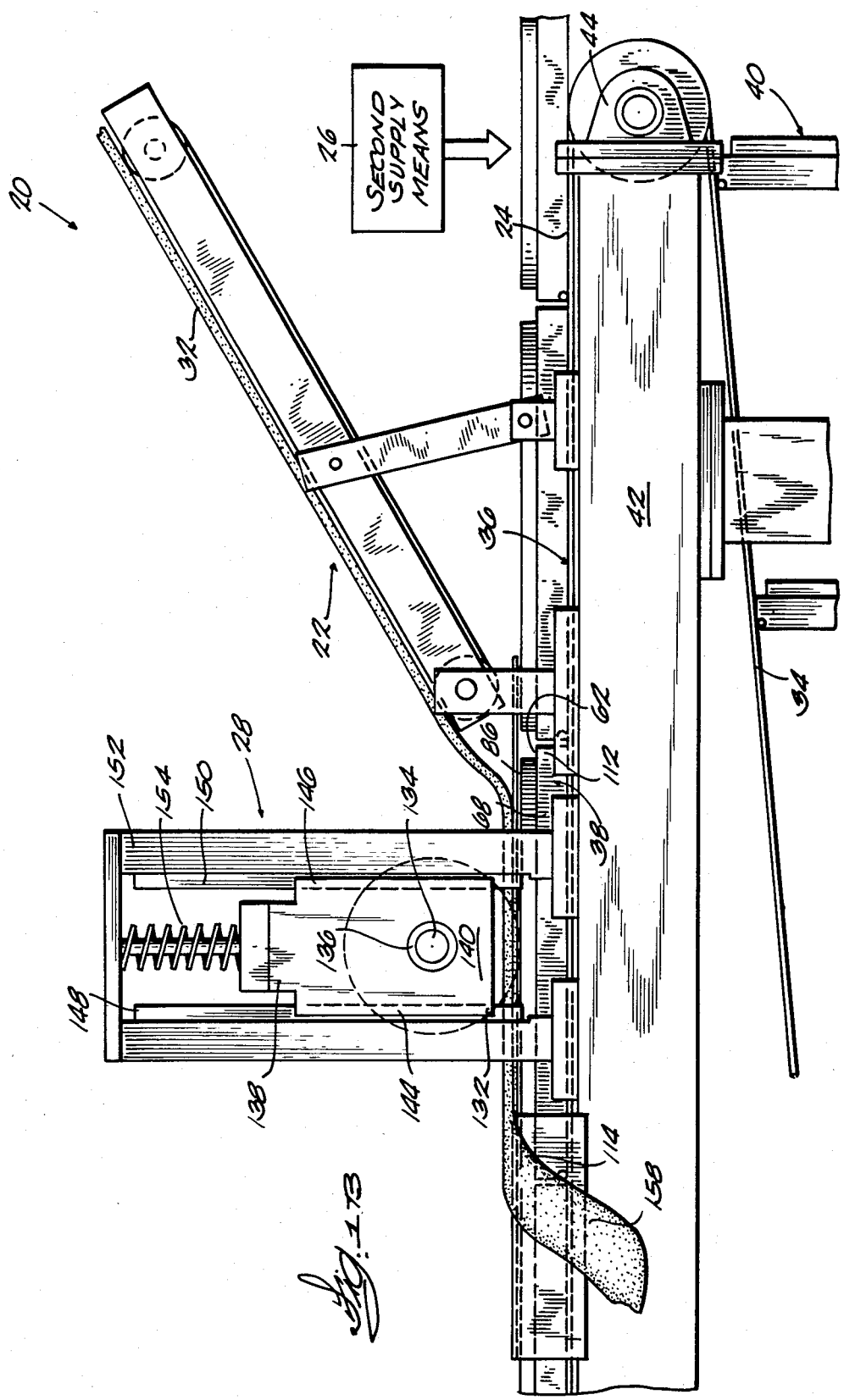

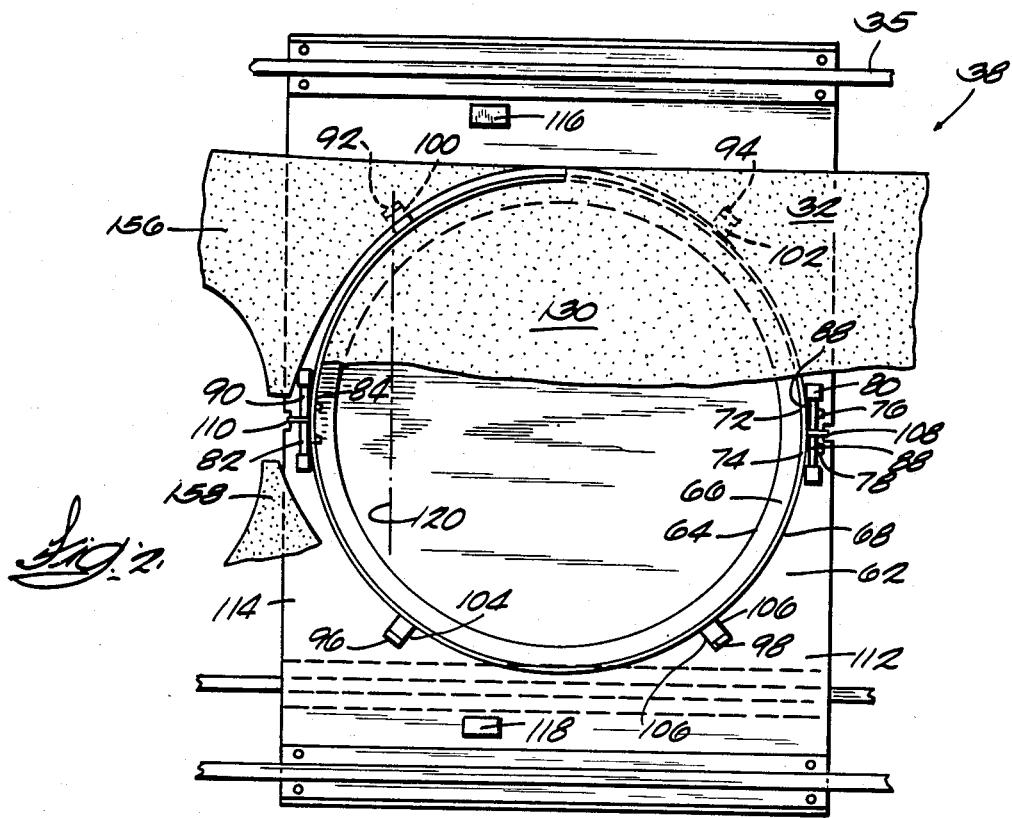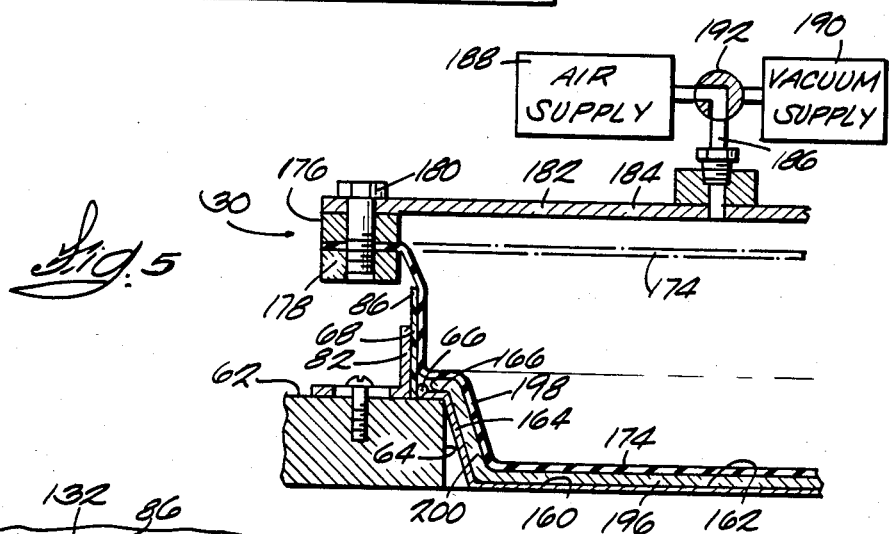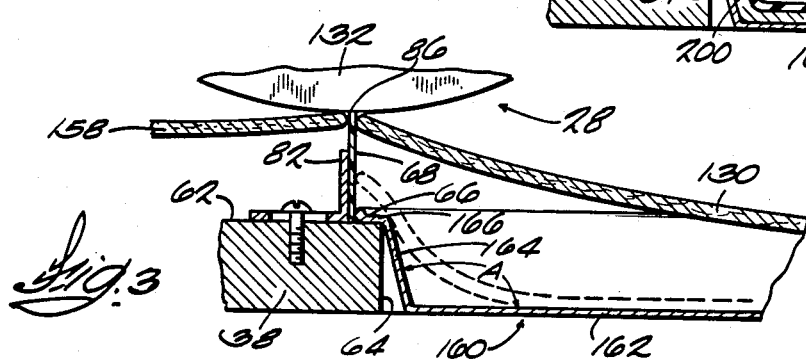

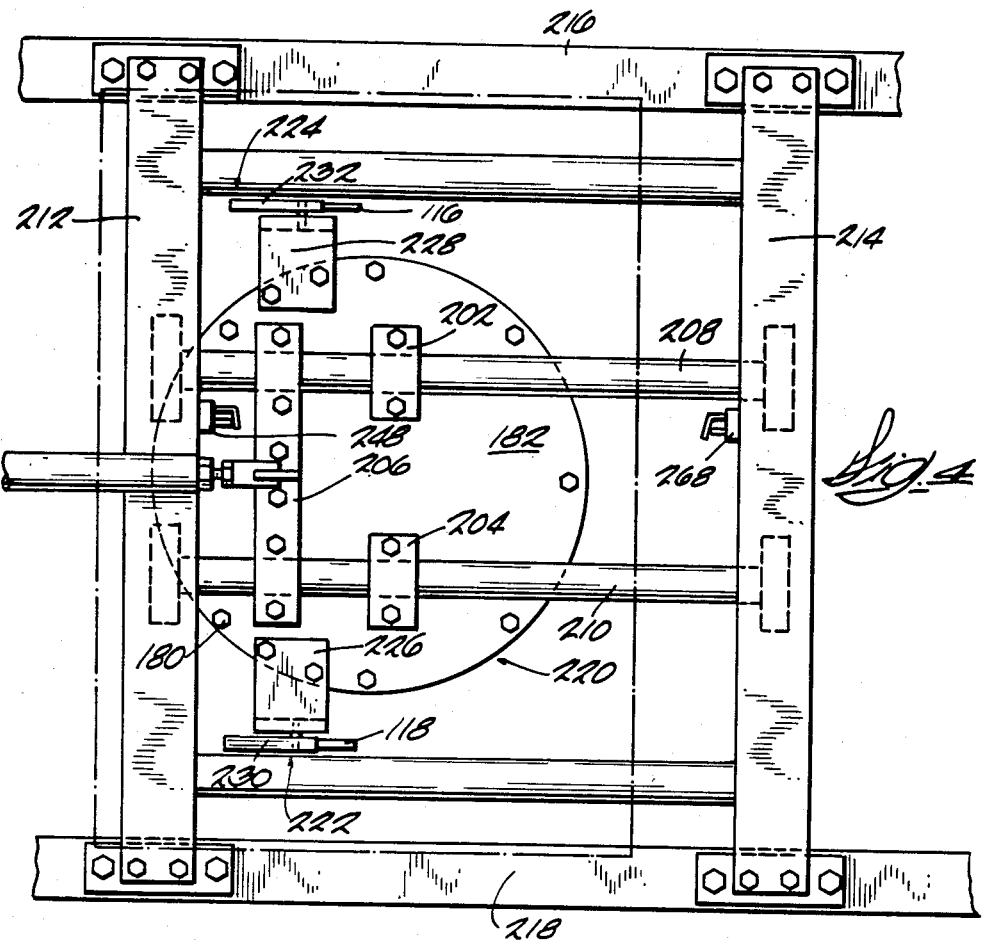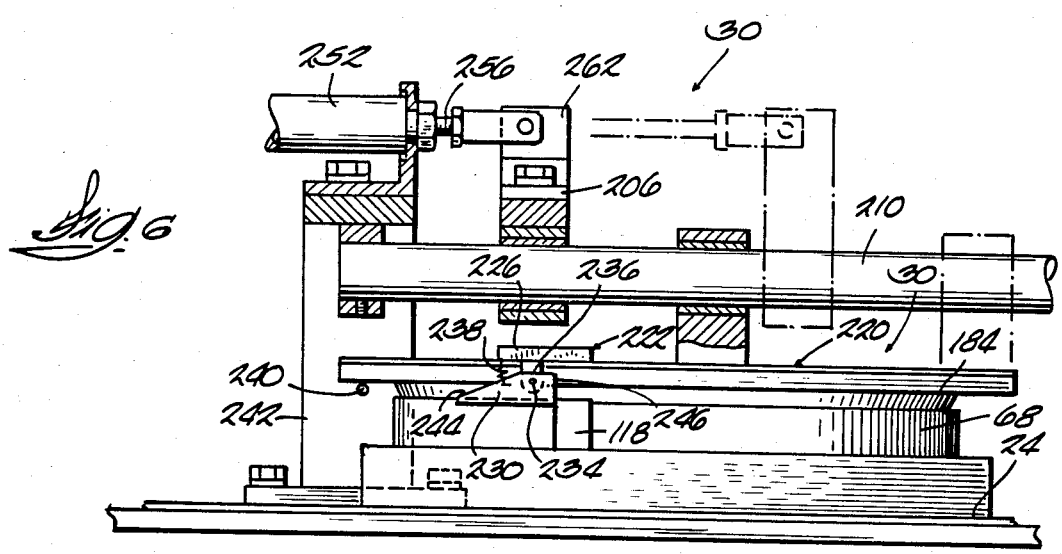

METHOD FOR MAKING DEEP DISH PIZZA CRUSTS OR THE LIKE

This is a division of application Ser. No. 472,555, filed Mar. 7, 1983, now U.S. Pat. No. 4,500,276.

TECHNICAL FIELD

The present invention relates to automated apparatus and methods for cutting disks from a ribbon of dough and conforming the disks in pie pans to form crusts, particularly deep dish pizza crusts.

BACKGROUND OF THE INVENTION

Dough made according to the preferred recipe for deep dish pizza crusts has special properties due to its yeasty composition. Being a bread type dough rather than a conventional pastry dough, deep dish pizza dough is very sticky and elastic and has a memory. Consequently, such dough is difficult to cut to a precise final size and cannot be radically deformed in a die. Furthermore, if too much pressure or shear is applied to deep dish pizza dough it will tear, will stick to the forming surface, or won't rise properly. Because of its special qualities, deep dish pizza dough cannot be processed by the typical automatic machinery employing male and female dies for shaping the crusts of dessert pies or conventional pizza shells.

Furthermore, deep dish pizza dough is preferentially formed into crusts having substantially vertical sides, while conventional pizza dough is formed into flat crusts and dessert pie dough is formed into crusts having a sidewall angle of about 130 degrees. Because deep dish pizzas have such steep sidewalls, they are even more difficult to form than other pies.

Deep dish pizza dough has heretofore been pressed into pans using manual labor rather than automatic machinery. The primary object of the present invention is to automate the process of making deep dish pizza crusts without compromising their shape, dimensional tolerances, or recipe.

SUMMARY OF THE INVENTION

The method invention is begun by providing a continuous ribbon or web of dough and superimposing the dough on a conveyor comprising serial flight plates, each carrying an upstanding cutting ring and supporting a pie pan within the ring. The dough is urged against the upper edge of each ring by a roller or other means, severing circles of dough within each ring which consequently fall into the corresponding pizza pans. The disk of dough draped on each pizza pan is then pressed into intimate contact with the pan by a distendable diaphragm, as the pan moves along under influence of the conveyor.

The apparatus for practicing the method invention is also novel, and comprises a pressing roller adjacent the flight plates for interacting with the cutting rings to sever disks of dough from the moving web without tearing the web or disk irregularly or stopping the travel of the conveyor. The diaphragm forming means is carried on a carriage which reciprocates alternately in the machine and contra-machine directions.

The carriage moves in concert with one of the flight plates after the bladder is in registry with a pan and while the bladder is inflated to press the dough into a shape complementary to the pizza pan as the pan moves. Thus the dough pressing operation is continuous. After the crust is pressed to conform in shape to the pan, the bladder assembly is removed and the carriage returns to intercept another pan to repeat the pressing operation.

Still another important feature of the apparatus invention is means for changing the diameters of the cutting rings so for a particular dough recipe or processing condition the final crust will have the desired dimensions to account for the particular elasticity, memory, or other characteristics of the dough.

The method of the invention and the apparatus disclosed therefore enable machine processing of highly fermented dough without the need for chemicals or conditioners to enable the dough to respond after being machine worked.

BRIEF DESCRIPTION OF DRAWINGS

FIGS. 1A and 1B are a side elevation of the present machine.

FIG. 2 is a top plan view of one flight plate of the conveyor shown in FIG. 1.

FIG. 3 is an enlarged detail view of FIG. 1, partly in section, showing the cooperation of the anvil roller and cutting ring to sever individual disks of dough from the ribbon of dough supplied to the machine.

FIG. 4 is a fragmentary top plan view of the structure shown in FIG. 1A, illustrating the diaphragm forming assembly and its carriage.

FIG. 5 is a fragmentary longitudinal section of the diaphragm according to the present invention, showing its distended position for forming the crust in full lines and its withdrawn position for clearing the conveyor flight plates in broken lines.

FIG. 6 is an enlarged fragmentary side elevation of the structure shown in FIG. 1A, illustrating the means by which the carriage for the diaphragm progressively engages each flight plate, disengaging it after the crust is formed by the diaphragm.

BRIEF DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. While the best known embodiment has been described, the details may be changed without departing from the invention, which is defined by the claims.

Referring first to FIGS. 1A and 1B, pizza crust forming apparatus 20 generally comprises first supply means 22 for feeding a substantially continuous ribbon of pizza dough into the apparatus; conveyor means 24 for conveying pie pans and superimposed dough through apparatus 20; second supply means 26 for placing pizza pans serially on conveyor means 24; anvil means generally indicated at 28 for interacting with the conveyor to cut the pizza dough into individual disks for further forming; and diaphragm means 30 for forming each disk intimately against the pan which contains it.

First supply means 22 is here represented by an endless infeed conveyor whose path converges with conveyor means 24. Supply means 22 is representative of automated pizza dough rolling equipment which is commercially available to the trade. One commercial vendor is Seewer Rondo Inc. of Hackensack, N.J. Such equipment is capable of producing and conveying a continuous ribbon of dough, here shown as 32.

Conveyor means 24 is an endless chain 34, to which an endless series of flight plates such as 36, 38, 40, and so forth are secured in well known fashion. Chain 34 is carried on a bed 42 by sprockets 44 and 46 and an idler sprocket 48, the latter being provided with suitable means for shifting up or down to change the tension of chain 34. Sprocket 46 is fixed with respect to a coaxial sprocket 50 which is turned by sprocket 52 via drive chain 54. Sprocket 52 is turned by the output shaft 56 of a gear reduction box 58 driven by an electric motor 60.

Each flight plate 38, seen in detail in FIG. 2, has a generally flat surface 62 including a perforation 64 for receiving the recessed portion of a pie plate. The margin 66 surrounding perforation 64 comprises support means within cutting ring 68 for supporting a pie pan.

Cutting ring 68 is preferably an elongated rectangular strip of sturdy plastic having ends 72 and 74 which are brought substantially together in abutting relation and attached by fasteners such as 76 and 78 to a bracket 80 secured to surface 62. A similar assembly of bracket and fasteners indicated at 82 secures the middle 84 of cutting ring 68 to surface 62. In this embodiment of the invention cutting ring 68 is a cylinder supported by surface 62 and having an upstanding or top edge 86 (best illustrated in FIG. 3). Ends 72 and 74, the bridging portion 88 of bracket 80, the bridging portion 90 of bracket assembly 82, or a combination of those parts are horizontally slotted, allowing first and second ends 72 and 74 to be moved apart or together to change the effective diameter of cutting ring 68. When the ring is expanded slightly, the gap between first and second ends 72 and 74 is not so great as to seriously interfere with cutting. If greater adjustability is desired, the material forming cutting ring 68 can be more elongated and its ends overlapped to provide adjustability without a gap between ends 72 and 74.

Cutting ring 68 is further kept in position by blocks 92, 94, 96, and 98, which can respectively be fixed at any desired position along radially disposed slots 100, 102, 104, and 106 to change the diameter to which cutting ring 68 is confined. To some extent, the upstanding cutting edge 86 of ring 68 can be deformed to change its shape slightly, which is sometimes important because pizza dough occasionally has a tendency to shrink more in the machine direction than in the cross-machine direction, as it is elongated substantially in the machine direction during the rolling process by which the ribbon 32 is initially formed. By moving blocks 92-98 radially inwardly or outwardly to positions not quite keeping cutting ring 68 circular, minor adjustments of this nature can be made.

Brackets 80 and 82 also respectively support knives 108 and 110 which extend in the machine direction before and behind cutting ring 68. Knives 108 and 110 have cutting edges substantially in the plane of cutting edge 86. A series of flight plates 38 are substantially abutted to form conveyor means 24, and the knife 108 of the trailing edge 112 of each flight plate such as 38 abuts knife 110 at the leading edge 114 of another flight plate. Consequently, a substantially unbroken knife edge extends in the machine direction from the cutting ring 68 of a particular flight plate 38 forward and aft to the cutting rings of adjacent flight plates. The purpose for knives 108 and 110 is to cooperate with the respective cutting rings such as 68 to longitudinally sever ribbon 32 completely in two so that the scrap remaining after the disks are pressed out can be removed from the machine.

Each flight plate 38 also includes lugs such as 116 and 118 for a purpose explained below. Finally, broken line 120 is the line of contact between anvil means 28 and upstanding cutting edge 86 (as well as knives 108 and 110), as further explained immediately below.

Referring now to FIGS. 1 and 3, the anvil means generally indicated at 28 provides a surface against which cutting edge 86 and knives 108 and 110 act to sever disks 130 of dough from ribbon 32. Anvil means 28 here comprises a transversely disposed roller 132 rotatably carried on a shaft 134 journaled in rotation bearings such as 136. The bearings 136 are mounted to a yoke 138 so roller 132 is suspended between depending arms 140 and 142 (the latter is not shown). Yoke 138 constitutes a carriage having guides such as 144 and 146 slidably engaging tracks such as 148 and 150 supported by a stationary frame generally indicated at 152. Yoke 138 is biased downwardly with respect to frame assembly 152 by a spring assembly 154, which can alternately be hydraulic means, pneumatic means, or other means of biasing yoke 138. As best illustrated in FIG. 3, this downward bias urges roller 132 gently against upstanding edge 86 and knives 108 and 110, thus separating ribbon of dough 32 into discrete disks 130 disposed within cutting rings 68 and transversely related scraps 156 and 158 disposed outside rings 68. Scraps 156 and 158 can be separately led away from the conveyor and directed to reprocessing means (not shown) using well known conveying apparatus. Because the contact area between roller 132 and upstanding edge 86 is extremely slight (represented as the double intersection of dashed line 120 in FIG. 2 and upstanding edge 86), and particularly because substantially all the dough is expressed from the infinitesimal space between roller 132 and upstanding edge 86, there is little tendency for the disks or scraps of cut dough to be taken up on the surface of roller 132. Furthermore, any such tendency can be counteracted by providing a low friction surface for roller 132. Another aspect of the particular cutting means shown is that there is little relative motion between the surface of roller 132 and upstanding cutting edge 86 while the dough is in contact, other than the minute deformation resulting when the dough is squeezed between the surface of roller 132 and upstanding cutting edge 86. The severed disks 130 disposed within each cutting ring 68 fall into pans 160 due to the weight of the former. The dough disk 130 shown in full lines in FIG. 3 is just starting to fall into pan 160.

Each pan 160 has a generally flat central portion 162, an inclined sidewall 164, and a marginal lip 166. Central portion 162 and sidewall 164 define the legs of an angle A. A typical pie pan or less preferred pizza pan might have an angle A of about 130 degrees, but a deep dish pizza pan has an angle A not much larger than 90 degrees, and in fact very close to 90 degrees, much like the relation of the sidewall and central portion of a baking pan for a layer cake.

Turning now to FIGS. 1A, 3, and 4-6, the structure constituting diaphragm means 30 is illustrated for the present embodiment. Referring first to FIG. 1A, the basic part of diaphragm means 30 is a highly elastic diaphragm 174, shown distended in full lines and withdrawn in broken lines in FIG. 5. Diaphragm 174 is clamped between sealing rings 176 and 178 secured by bolts such as 180 to a backing plate 182 to form a substantially airtight plenum 184. The only access to the interior of plenum 184 is via a conduit 186 which is connected to an air supply 188 and a vacuum or negative pressure supply 190 via reversing valve 192. Valve 192 can either provide communication between air supply 188 and plenum 184, distending diaphragm 174 to the position shown in full lines in FIG. 5, or between vacuum supply 190 and plenum 184, withdrawing diaphragm 174 to the position shown in broken lines in FIG. 5. Distending diaphragm 174 urges disk 130 approximately from the unconformed position shown in dashed lines FIG. 3 to the fully conformed position shown in FIG. 5, thereby forming a pizza crust 196 having substantially its ultimate configuration. An important advantage of conforming disk 130 with a diaphragm 174, instead of with a die, is that even if the sidewall 164 of pan 160 is substantially vertical, forming an angle A as previously defined of substantially 90 degrees, the portion 198 of diaphragm 174 corresponding to sidewall 164 can provide the necessary normal or perpendicular force to form sidewall 200 of pizza crust 196 in intimate contact with sidewall 164. If a male and female die set was used in the attempt to conform the dough, the sidewalls of the respective die portions would exert a tremendous shearing force, greater for a nearly vertical wall than for a more oblique wall. Thus, the present apparatus is inherently capable of forming a steeper sidewall without damaging the dough or causing it to spring back to its original shape.

Backing plate 182 has slides or linear bearing sleeves 202, 204, and 206 carried on guide rods 208 and 210, the respective ends of which are supported by transverse frame members 212 and 214 fixed to frame members 216 and 218. Guide rods 208 and 210 are stationary and parallel. Sleeves 202–206, backing plate 182, and associated structures make up a diaphragm carriage 220 for reciprocating diaphragm 174 back and forth in the machine and contra-machine direction. The purpose for reciprocating carriage 220 is to eliminate the need to stop and start conveyor means 24 each time diaphragm 174 is distended into a pie pan 164. The contra-machine direction stroke of carriage 220 moves diaphragm 174 to the next dough disk and pie pan to repeat the forming operation.

Carriage 220 includes abutment means generally indicated at 222 and 224, respectively comprising brackets 226 and 228 and latches 230 and 232 (best illustrated in FIG. 6). Each latch, for example 230, is rotatably secured by a pivot pin 234 to depending lug 236 of bracket 226. Latch 230 is biased into the position shown in FIG. 6 by a spring 238. As shown in FIG. 6, during the machine direction stroke of carriage 220 abutments 116 and 118 push latches 230 and 232, and diaphragm 174 is registered with cutting ring 68. Those relations are maintained during substantially the entire machine direction stroke of carriage 220.

The contra-machine direction stroke of carriage 220 is executed by first disengaging latches 230 and 232 from lugs 116 and 118 at the extremity of machine direction travel of carriage 220, withdrawing diaphragm 174 to eliminate interference with the flight plates, then employing pneumatic means to drive carriage 220 in the contra-machine direction to meet a subsequent flight plate of said conveyor. Turning again to FIG. 6, trigger means, here a peg 240 secured to a fixed frame member 242, comes into contact with a ramp 244 of latch 230, the ramp being so shaped as to rotate latch 230 counterclockwise due the movement of carriage 220. When latch 230 rotates, lug 118 is enabled to pass latch 230. Substantially at the same time latches 230 and 232 are triggered, linear bearing sleeve 206 trips limit switch 248, operating a solenoid reversing valve 250 (FIG. 1A) to operate the pneumatic means which drives carriage 220 in the contra machine direction.

The pneumatic means includes a cylinder 252 within which a piston 254 travels, driving a piston rod 256 connected by a clevis 258 and clevis pin 260 to an upstanding lug 262 of bearing sleeve 206. During the contra-machine direction stroke reversing valve 250 allows communication between air supply 188 and the interior 264 of cylinder 252, and vent 266 is blocked off. At the end of the contra-machine direction stroke, limit switch 268 switches solenoid reversing valve 250 so interior 264 of cylinder 252 communicates with vent 266. If desired, vent 266 can include flow restriction means to resist the force exerted by moving lugs 116 and 118 on latches 230 and 232, ensuring firm contact between faces such as 246 and lugs 116 and 118.

Switches 248 and 268 also operate reversing valve 192, so while carriage 220 is traveling in the contra-machine direction under the influence of cylinder 252 diaphragm 174 remains withdrawn, and while carriage 220 is traveling in the machine direction diaphragm 174 is distended. Suitable flow restrictions or other means can be provided so diaphragm 174 does not distend before abutment means 222 and 224 are in contact with lugs 116 and 118.

Finally, conventional pan removal means 280, illustrated schematically in FIG. 1A, are provided to lift each finished pan and crust out of its flight plate and transfer it to further conveying means for packaging or other final treatment. It will be appreciated that the functions of second supply means 26 and pan removal means 280 can be performed manually by an operator. But the necessary number of operators can be reduced if automatic pan supply and removal means are provided.

The method inventions have already been described in connection with the illustrated machinery.

I claim:

1. An automated method for forming pie crusts having substantially vertical sidewalls, comprising the steps of providing disks of dough, providing pie pans having substantially vertical sidewalls; draping each said disk over one said pie pan; positioning a distendable diaphragm above and generally parallel to each said disk; applying fluid pressure to said diaphragm, thereby distending said diaphragm against said disk and conforming said disk against said pan, forming said disk into a crust; and removing said fluid pressure, thereby releasing said diaphragm from said crust.

2. The method of claim 1, further comprising the final step of applying negative fluid pressure to said diaphragm, thereby assisting withdrawal of said diaphragm from said crust.

3. The method of claim 1, further comprising the intermediate step, between said providing and positioning steps, of transporting said pie pans and associated disks of dough serially on a moving conveyor.

* * * * *